(12) United States Patent
Hillis et al.

(10) Patent No.: US 10,078,208 B2
(45) Date of Patent: *Sep. 18, 2018

(54) PORTABLE TELESCOPE

(71) Applicant: Applied Invention, LLC, Burbank, CA (US)

(72) Inventors: W. Daniel Hillis, Encino, CA (US); Taylor Roan, Burbank, CA (US)

(73) Assignee: Applied Invention, LLC, Burbank, CA (US)

(*) Notice: Subject to any disclaimer, the term of this patent is extended or adjusted under 35 U.S.C. 154(b) by 329 days.

This patent is subject to a terminal disclaimer.

(21) Appl. No.: 14/979,227

(22) Filed: Dec. 22, 2015

(65) Prior Publication Data

US 2016/0109695 A1 Apr. 21, 2016

Related U.S. Application Data

(63) Continuation of application No. 13/186,294, filed on Jul. 19, 2011, now Pat. No. 9,223,126.

(60) Provisional application No. 61/365,693, filed on Jul. 19, 2010.

(51) Int. Cl.
| | |
|---|---|
| *G02B 23/24* | (2006.01) |
| *G02B 23/20* | (2006.01) |
| *G02B 23/02* | (2006.01) |
| *G02B 23/16* | (2006.01) |
| *G02B 23/04* | (2006.01) |
| *G02B 23/14* | (2006.01) |
| *H04N 7/18* | (2006.01) |

(52) U.S. Cl.
CPC ......... *G02B 23/2446* (2013.01); *G02B 23/02* (2013.01); *G02B 23/04* (2013.01); *G02B 23/14* (2013.01); *G02B 23/16* (2013.01); *G02B 23/20* (2013.01); *G02B 23/2453* (2013.01); *G02B 23/2484* (2013.01); *H04N 7/185* (2013.01)

(58) Field of Classification Search
CPC .......... G02B 23/00–23/26; F16M 9/00–9/425; F16M 2200/00–2200/008
USPC ................. 359/362–435, 503–506, 811, 819
See application file for complete search history.

(56) References Cited

U.S. PATENT DOCUMENTS

| | | | |
|---|---|---|---|
| 2,711,589 A | 6/1955 | Stock | |
| 3,840,284 A | 10/1974 | Rand | |
| 3,885,858 A | 5/1975 | Hildemann | |
| 4,129,278 A | 12/1978 | Bressler | |
| 5,537,250 A | 7/1996 | Masunaga et al. | |
| 6,467,738 B1 | 10/2002 | Hedrick et al. | |
| 7,382,533 B1 | 6/2008 | Peters, Jr. | |
| 9,223,126 B2 * | 12/2015 | Hillis | G02B 23/02 |
| 2004/0051942 A1 | 3/2004 | Compton | |
| 2004/0136061 A1 | 7/2004 | Denpo et al. | |
| 2009/0161211 A1 | 6/2009 | Jianguo et al. | |
| 2010/0085638 A1 | 4/2010 | Lopresti | |
| 2014/0111853 A1 | 4/2014 | Xu et al. | |

* cited by examiner

Primary Examiner — Bumsuk Won
Assistant Examiner — Jeffrey Madonna
(74) Attorney, Agent, or Firm — Michael A. Glenn; Perkins Coie LLP

(57) ABSTRACT

A portable telescope that takes advantage of an offset optical pathway between the objective tube and eyepiece tube that allows adjustment of the eyepiece height independent of the objective tube elevation. A user-friendly, motorized, interactive, self-calibrating portable telescope with an offset optical path.

29 Claims, 12 Drawing Sheets

PORTABLE TELESCOPE

CROSS REFERENCE TO RELATED APPLICATIONS

This application is a Continuation of U.S. application Ser. No. 13/186,294, filed 19 Jul. 2011, which claims priority from U.S. Provisional Patent Application Ser. No. 61/365,693, filed 19 Jul. 2010, which are each incorporated herein in its entirety by this reference thereto.

BACKGROUND OF THE INVENTION

Technical Field

The invention relates to telescopes. More specifically, the invention relates to portable telescopes having an offset in the optical pathway, advanced finder features, and convenient setup and storage features.

Description of the Related Art

One of the biggest barriers of entry for a would-be amateur astronomer and one of the most tedious chores to already amateur astronomers is the daunting task of setting up and initially calibrating a telescope. Indeed, the positions of astronomical objects in the celestial sky are based upon a complex spherical coordinate system involving the perpendicular axes of right ascension and declination, determination of which requires a theodolite, a clock, and an accurate knowledge of the observer's latitude and longitude. The theodolite is used to measure the object's angle above the local horizon; the object's declination is then calculated to be the angle between the Celestial Equatorial Plane (CEP) and the North Celestial Pole (NCP). An arbitrary 0° longitudinal line has been defined as a line engraved on a brass plate set in the floor of the Old Royal Observatory in Greenwich, England.

The object's right ascension requires a knowledge of the Local Sidereal Time, being based upon the moment of Local Sidereal Time the object transits the observer's zenith, or local meridian. Also, since the Earth makes one full turn about its polar axis about every twenty-four hours, right ascension is traditionally referred to in hours, from zero to twenty-four. Note, however, that right ascension is converted to degrees, with one hour of right ascension equaling 15°, or 1/24 of a 360° circle. Hours are further divided into finer units of 60 arcminutes, written 60', or 3600 arcseconds, written 3600". Furthermore, because the Earth's axis of rotation moves, causing the coordinate grid to shift, an object's right ascension and declination are continually changing. Thus, an object's precise position is date dependent, with the current standard being equinox 2000.0, which means the object's right ascension and declination at the moment the year 2000 began. For example, the star Vega (Alpha Lyra) currently may be found at approximately 18 h 37 m right ascension, and approximately +38 47' declination.

As can be appreciated, locating astronomical objects and positioning a telescope for observation can be a difficult, frustrating, and time consuming process. Furthermore, once the telescope has been repositioned to observe a second object, a large part of the process must be inefficiently and inconveniently repeated to reacquire the first object. Similarly, once an observer locates a particular object, a second observer must position himself at the vantage point of the original observer. Depending on the relative heights of the observers, this might require bending down, using ladders, etc. Likewise, there are times when a second observer cannot easily reach a first user's height, for example, a wheel-chair-bound observer.

An alternative to setting up a telescope to view astronomical objects is a pure digital solution in the form of a virtual sky map, such as Google™ Sky. However, these pure digital solutions do not satisfy an enthusiast's desire for authenticity and, more importantly, cannot be used to gather actual data in real time.

SUMMARY OF THE INVENTION

In view of the foregoing, the invention provides a portable telescope that is easy to set up, is capable of having the eyepiece readjusted to accommodate viewers at various heights without altering the area visible through the telescope, and is integrated with a finder scope and a display populated with helpful imagery to enhance the viewing experience of astronomical objects.

In particular, the portable telescope provides exceptional portability; ease and pleasure of set up; ease and pleasure of use; optical quality; workmanship quality; an ability to share the viewing experience with other astronomers, non-astronomers, children, and people with physical limitations requiring an adjustment to the eyepiece.

The invention involves an offset in the optical pathway between the objective tube and eyepiece tube that allows adjustment of the eyepiece height independent of the objective tube elevation. Accordingly, the invention allows convenient use of the portable telescope by users of varied height.

Additionally, some embodiments of the invention involve motorizing various components and automatically positioning the telescope in order to avoid the complicated setup process of the prior art, to track or seek objects, and to provide haptic feedback to a user.

Some embodiments of the invention involve an advanced finder scope associated with the objective lens of the telescope, wherein the finder scope enhances the ability to locate and identify objects. In some embodiments of the invention, the finder scope is coupled with a sensor coupled with a computer processor and an astrological database that includes position data and other information about stars, galaxies, planets, black holes, nebulae, comets, etc. According to these embodiments, an illuminated display overlays imagery atop the field of view of the finder scope. According to some embodiments, the imagery, as determined by a star tracker and star map, and an integrated laser pointer ease navigation and discussion of the night sky by experienced and novice astronomers alike.

Some embodiments of the invention involve an integrated wheeled case for securing and transporting the portable telescope, thereby providing smooth and secure transport and enabling simple and efficient removal, setup, and stowage. Some embodiments involve a functional case that is integrated with the tripod legs and telescope themselves.

DETAILED DESCRIPTION OF THE INVENTION

The invention takes advantage of an offset optical pathway to allow the angle of inclination of the objective lens to be adjusted independently of the inclination and, therefore, the height of the eyepiece. Because the eyepiece can be moved without interfering with the position of the objective lens, the telescope provides users at different heights the opportunity to view the same portion of the sky without readjusting the objective lens tube.

Structural Overview

Figure 1:
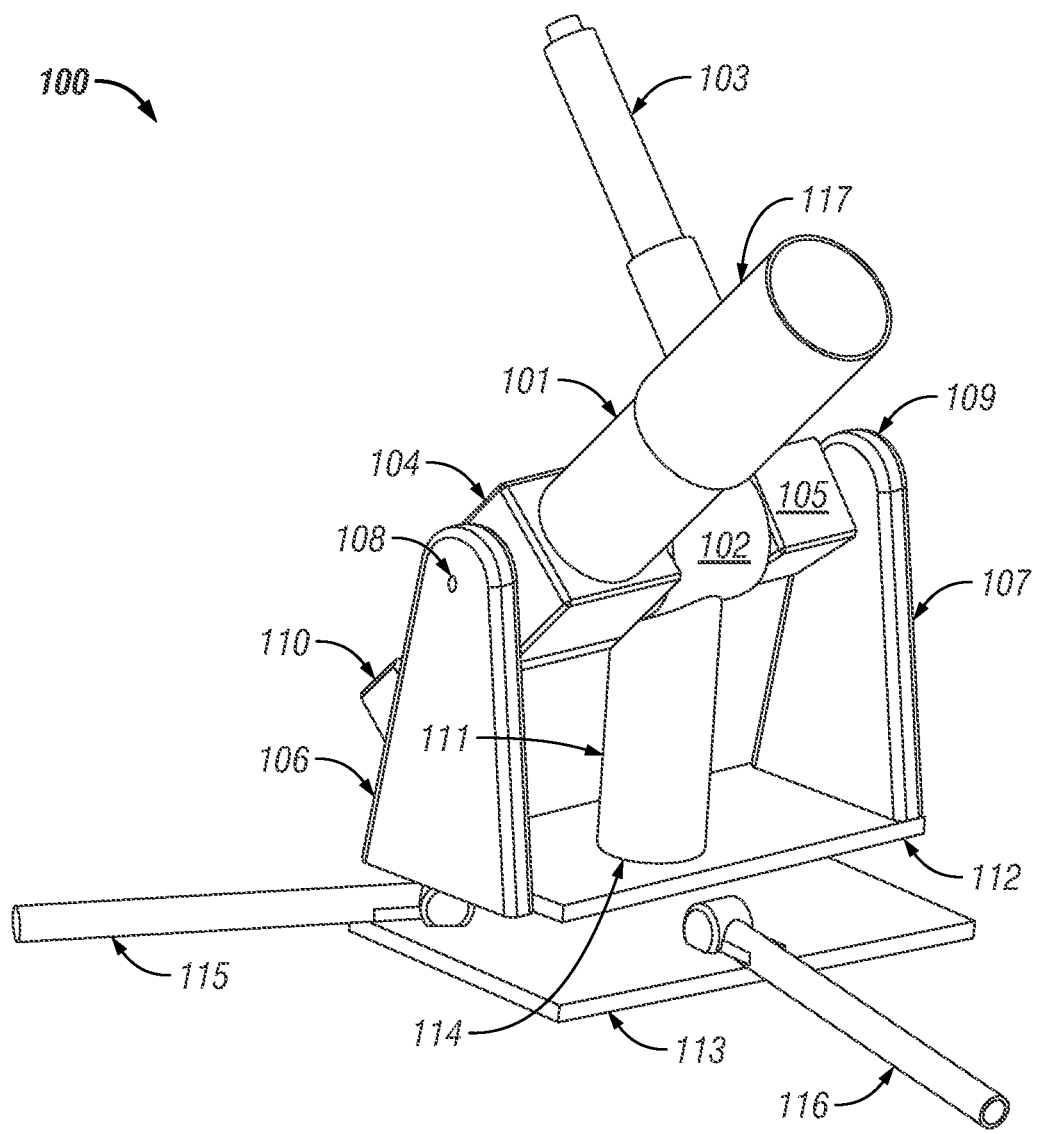
FIG. 1 illustrates a structural overview of a portable telescope according to some embodiments of the invention.

FIG. 1 illustrates a structural overview of a portable telescope 100 according to some embodiments of the invention. According to FIG. 1, the primary components of the telescope 100 are an objective tube 101 with a telescoping dew shield 117, a connector tube 102, a telescoping eyepiece tube 103 having two segments, and two mirror boxes 104, 105. The two mirror boxes 104, 105 lie between the objective tube 101 and the connector tube 102 and between the connector tube 102 and the eyepiece tube 103 along the optical pathway. Side supports 106, 107 extend upward from the structural support base 112 to engage the mirror boxes at pivots 108, 109.

As shown in FIG. 1, a counterweight 110 extends from the mirror box 104 in opposition (about the pivots) to the objective tube 101. In some embodiments, a counterweight (not shown) extends from the mirror box 105 in opposition (about the pivots) to the eyepiece tube. In some other embodiments of the invention, the counterweights are configured to slide over or out from the objective tube and eyepiece tube, as explained with reference to FIG. 4A below.

The connector tube 102 is supported by a central support 111 that extends downwards to a structural support base 112. The structural support base 112 is coupled to the telescope base 113 via a pivot 114, i.e. a thrust bearing, which allows the user to adjust the azimuth of the objective tube 101. In some embodiments of the invention, a locking mechanism (not shown) allows the user to secure the objective tube 101 against rotation about azimuth pivot 114 once the desired azimuth is attained. In some embodiments of the invention, one or more mechanized, non-actuated friction clutches (not shown) is included in the pivot 108, pivot 109, and/or pivot 114 as a torque limiter.

In some other embodiments of the invention, the central support 111 couples with the telescope base 113 via said pivot 114 without the intermediary structural support base 112.

The portable telescope 100 of FIG. 1 also comprises three tripod legs 115, 116, 117 (tripod leg 117 is not shown in this perspective). Each of three tripod legs 115, 116, 117 is connected to the telescope base 113 by a hinge, allowing the tripod legs to pivot downward from a vertical (upward pointing) orientation to extend below the telescope base 113. In the presently preferred embodiments, the telescope base 113 serves as a case floor for a multi-functional case, as explained below. In some embodiments of the invention, the tripod legs 115, 116, 117 are fitted with non-marring feet for use on smooth or delicate surfaces. In some embodiments of the invention, the tripod legs 115, 116, 117 are fitted with spiked ends to ensure three precise points of contact.

In the presently preferred embodiments of the invention, the tripod legs 115, 116, and 117 of the telescope are collapsible, thereby allowing the telescope to be stored within a multi-functional case. The multi-functional case is explained in greater detail below.

The objective tube 101 and eyepiece tube 103 connect to their respective mirror boxes 104, 105 at fixed insertions. Similarly, the central support 111 connects to the connector tube 102 at a fixed insertion. However, in the presently preferred embodiments of the invention, the connections (i.e. sealed ring bearings) between the mirror boxes 104, 105 and the connector tube 102 permit rotation, enabling the objective tube 101 and eyepiece tube 103 to pivot relative to the connector tube 102 and to one another.

Also in the presently preferred embodiments of the invention, the central support 111 is hollow, thereby allowing air to circulate in through a vent (not shown) at the base of the central support 111 (and preferably through a filter and desiccator), up through the central support 111, and into the connector tube 102. The clean, dry air keeps the mirrors within the mirror boxes free of dust and condensation. Also, in some embodiments of the invention, a one-way valve (not shown) is disposed in the eyepiece tube 103. The one-way valve permits evacuation of air that enters the optical path when the eyepiece tube is extended and air enters through the filter and desiccator.

In some embodiments of the invention, the primary components of the portable telescope are fabricated from black carbon fiber and anodized (i.e. clear or black) aluminum. In some embodiments, the auxiliary hardware (i.e. knobs) is fabricated from visually contrasting metal such as nickel, stainless steel, or brass.

The presently preferred embodiments of the invention involve motorizing various components and automatically calibrating and positioning the portable telescope in order to avoid the complicated setup process of the prior art. In some embodiments of the invention, the motion of the objective tube about the elevation pivot and the azimuth pivot can be driven by motors. In some embodiments, the current angular positions are determined by a finder scope and star tracker, while in other embodiments the current angular positions monitored by digital encoders and/or accelerometers. The finder scope, star tracker, and motorized control of the portable telescope are discussed in greater detail below.

Ease of Use and Assembly

Figure 2A:
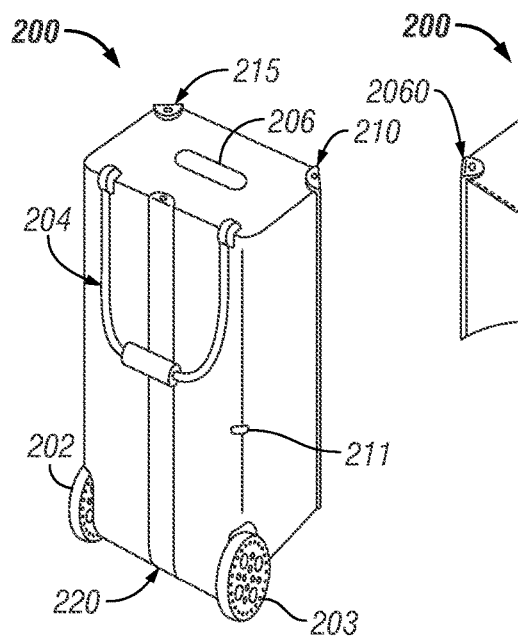
FIG. 2A illustrates a generalized view of a multi-functional portable telescope case in a transport configuration according to some embodiments of the invention.

FIGS. 2A-2D illustrate generalized views of a multi-functional portable telescope case 200 according to some embodiments of the invention. In the presently preferred embodiments of the invention, the telescope case 200 contains the telescope as well as any other accessory needed to operate the telescope—making the telescope completely portable. As shown in FIG. 2A, the portable telescope case 200 comprises a case body 211 and a wheeling handle 204. Optionally, the case 200 includes a nameplate 206.

Figure 2B:
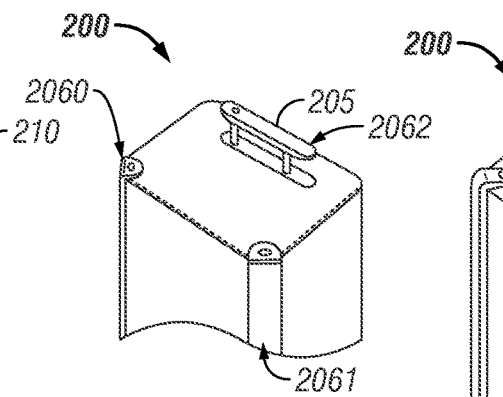
FIG. 2B illustrates a detailed view of the top of the multi-functional portable telescope case according to some embodiments of the invention
Figure 2C:
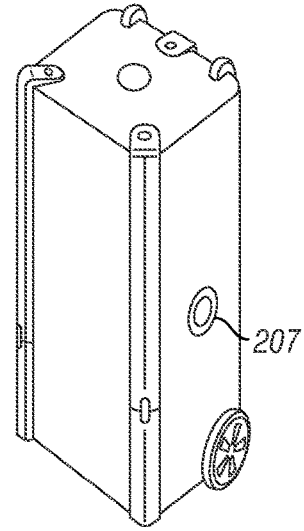
FIG. 2C illustrates a generalized view of a multi-functional portable telescope case in a transport configuration according to some embodiments of the invention.

In some other embodiments, the case 200 comprises a spring release handle 205, as shown in FIG. 2B. In some embodiments, as shown in FIG. 2C, the case 200 comprises one or more side handle 207.

The case 200 also comprises grooves (not shown) for accommodating wheels 202, 203, attached to the portable telescope housed within the case 200. Likewise, the case 200 comprises channels 2060, 2061, 2062 (channel 2062 is hidden from view behind handle 205) for accommodating tripod legs 210, 215, 220 attached to the portable telescope when the tripod legs 210, 215, 220 are in an upward pointing, stowed position. The tripod legs 210, 215, 220 and channels 2060, 2061, 2062 are configured to allow the tripod legs 210, 215, 220 to fold away from the case body 211 while the portable telescope is still housed therein. This feature serves to ensure that the portable telescope is appropriately secured to a surface before removing the protective case body 211 and exposing the delicate instrument.

In some embodiments of the invention, the tripod legs 210, 215, 220 include are hinged and configured with a pneumatic cylinder or other mechanism for damping the downward motion of the tripod legs 210, 215, 220 as they are folded down before locking them in place via a leg locking mechanism.

Figure 2D:
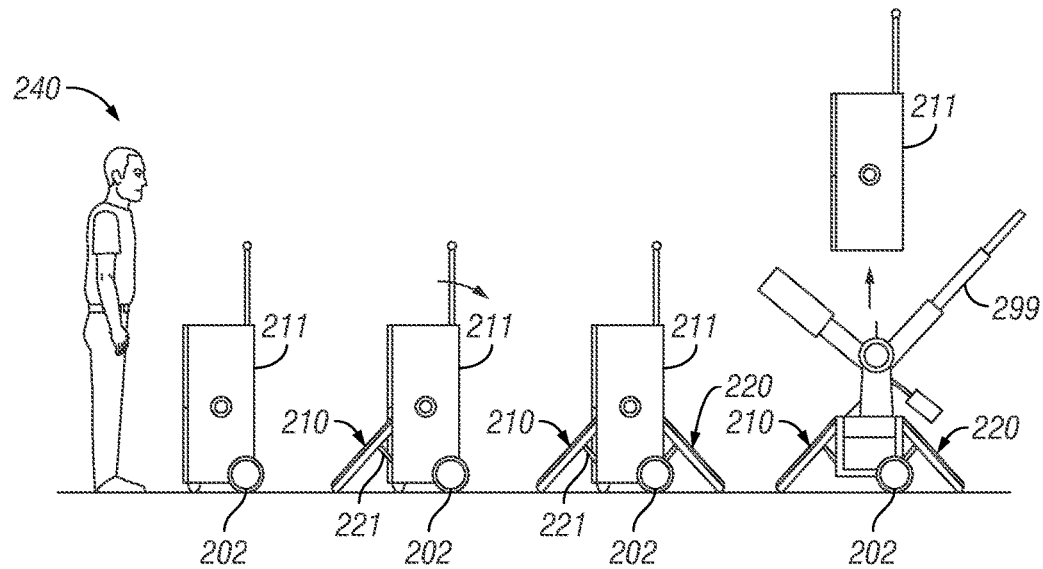
FIG. 2D illustrates a storyboard view of the portable telescope being unpacked from the multi-functional case according to some embodiments of the invention.

FIG. 2D illustrates a storyboard view 240 of the portable telescope 299 being unpacked from the case body 211 according to some embodiments of the invention. According to FIG. 2D, the case body 211 containing the telescope 299 is first rolled to a resting position. Next, the tripod legs 210, 215 (tripod leg 215 is not shown in this perspective) on the opposite side as the wheels 202, 203 (wheel 203 is not shown in this perspective) are folded out. The case body 211 is tilted about the wheels 202, 203 such that the tripod legs 210, 215 lock into place via a locking mechanism 221. Once the first two tripod legs 210, 215 are locked, the case body 211 is tilted in an opposite direction and the remaining tripod leg 220 is locked into place. In the presently preferred embodiments of the invention, the tripod legs 210, 215, and 220 are configured to a length sufficient to elevate the wheels 202, 203 of the portable telescope 299 above the supporting surface when the tripod legs are locked are locked in place. In some other embodiments, the wheels 202, 203 are integral to the case body 211 and are lifted off along with the case body 211.

Once the tripod legs 210, 215, and 220 are locked, the case body 211 is removed, exposing the portable telescope 299 contained inside. In some embodiments of the invention, the case body is thereafter used as a stool or table, as explained below.

The unpacking of the portable telescope 299 is explained in further detail below.

Figure 2E:
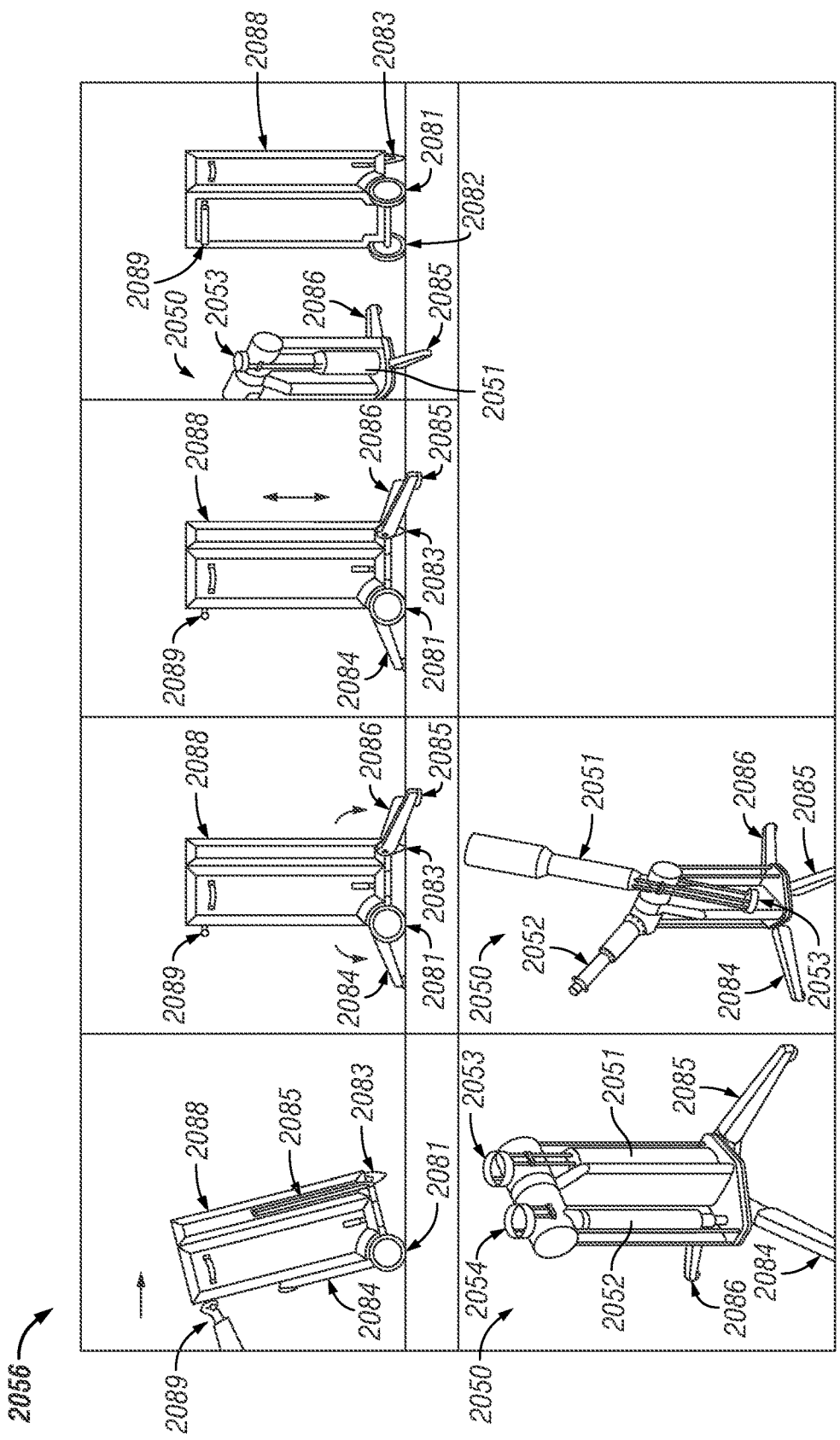
FIG. 2E illustrates an alternative method of unpacking a portable telescope according to some embodiments of the invention.

FIG. 2E illustrates a method 2056 of unpacking a portable telescope 2050 according to some embodiments of the invention. According to these embodiments, a portable telescope 2050 is packed within case 2088 having a handle 2089, wheels 2081, 2082 (wheel 2082 not shown in this perspective) on one side and feet 2083, 2079 (foot 2079 not shown in this perspective) on a second side. Accordingly, the packed telescope 2050 is configured to be rolled into place like a hand truck.

The case 2088 also comprises tripod legs 2084, 2085, 2086. With the case 2088 still on the telescope 2050, the case 2088 is rocked onto wheels 2081, 2082 and tripod legs 2085, 2086 are deployed. The case 2088 is then rocked onto feet 2083, 2079 and the final tripod leg 2084 is deployed. Next, one or more latches (not shown) holding the case 2088 to the telescope 2050 are released. The case 2088 is removed and set aside, thereby exposing the portable telescope 2050.

The portable telescope 2050 generally comprises an objective tube 2051, an eyepiece tube 2052, and counterweights 2053, 2054. Accordingly, once the case 2088 is removed, the counterweights 2053, 2054 are extended and the objective tube 2051 and eyepiece tube 2052 are rotated into position and the telescoping components are extended.

Figure 2F:
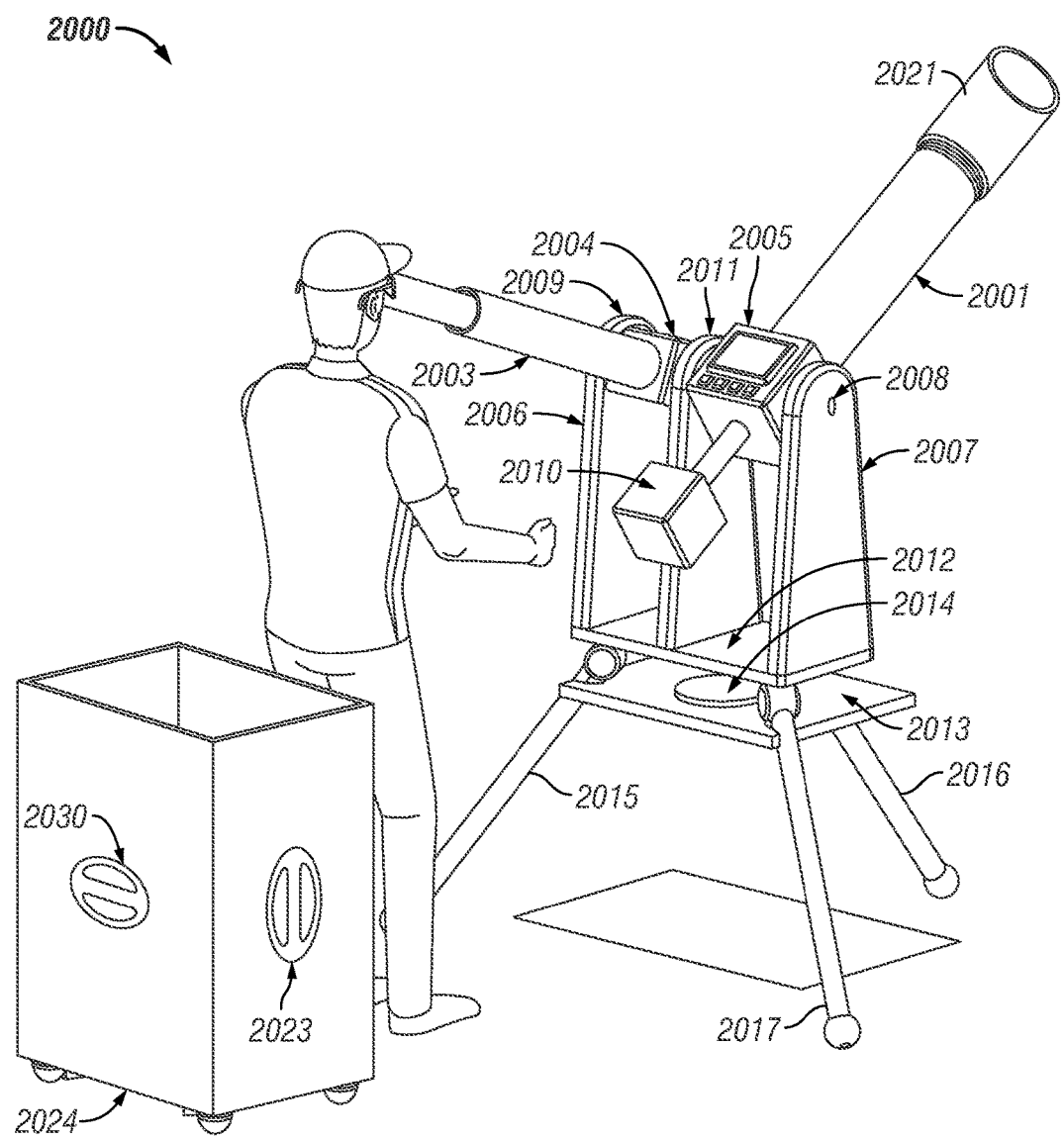
FIG. 2F illustrates an alternatively-designed portable telescope according to some embodiments of the invention.

FIG. 2F illustrates another example of a portable telescope 2000 according to some embodiments of the invention. The telescope 2000 of FIG. 2F comprises an objective tube 2001, an elevation pivot 2008, an eyepiece tube 2003, an eyepiece pivot 2009, a counterweight 2010, a structural support base 2012, a pivot 2014, a telescope base 2013, and tripod legs 2015, 2016, 2017. According to FIG. 2F, the objective tube 2001 and the eyepiece tube 2003 are supported by side supports 2006, 2007 and a center support 2011 and are optically coupled through mirror boxes 2004, 2005.

Also shown in FIG. 2F are a case 2024 and a dew shield 2021 coupled with the objective tube 2001. The case 2024 comprises handles 2030, 2023.

In some other embodiments of the invention, a crank mechanism aids the user in rotating the tripod legs 2015, 2016, 2017 into a downward pointing orientation, raising the telescope base 2013 of the portable telescope 2000 above the supporting surface. Once the portable telescope 2000 is at the desired height, the user tightens clampdown screws (not shown) or secures loops and hooks (not shown) to secure the tripod legs 2015, 2016, 2017.

The user continues setting up the portable telescope pivoting the objective tube 2001 about the elevation pivot 2008, rotating the end of the objective tube 2001 upward from its downward pointing, stowed orientation, and securing the objective tube 2001 against downward rotation with a lock knob, brake, or friction clutch (not shown).

Finally, the user slides a dew shield 2021 away from the objective tube 2001 and secures it by friction or a locking mechanism (e.g. a thumbscrew). Similarly, the user pivots the eyepiece tube 2003 about the eyepiece pivot 2009 to the desired angle; secures it with a lock knob, brake, or friction clutch; extends it to working length; and rotates the distal end or engages thumbscrews to secure it in the extended configuration.

In some embodiments of the invention, a first counterweight 2010 is coupled with the objective tube 2001 and a second counterweight (not shown) is coupled with the eyepiece tube 2003. The counterweights ensure that the objective tube 2001 and eyepiece tube 2003 are balanced about the elevation pivot and eyepiece pivot when in an extended configuration. In some other embodiments, the counterweights are replaced with springs or cams with constant force springs to balance the weight of the objective tube 2001 or eyepiece tube 2003. The objective tube 2001 and eyepiece tube 2003 thus rotate smoothly and effortlessly through their respective pivot ranges. Preferably, the ends of the ranges are defined by cushioned stops (not shown).

In an alternative design of the portable telescope, the tripod legs are attached to the underside of the telescope base 2013, with slots on the telescope base 2013 allowing the legs to pivot to an upward pointing configuration. When the portable telescope is packed, the tripod legs extend upward from the pivots along the exterior surface of the case, with a latch or fastener securing each leg in the upward pointing configuration. During setup, the legs are pivoted downward until the feet contact the supporting surface beneath the telescope base 2013 and the case is removed.

Optionally, using a crank and worm drive, the user synchronously pivots the legs further downward until the telescope base 2013 is at the desired height above the supporting surface. In some embodiments of the invention, small support bars extending inward from each leg connect to one another at a point immediately below the azimuth pivot to secure the legs at the desired angle.

Functional Case

In the presently preferred embodiments of the invention, when the portable telescope is not in use, it is collapsed and stored within a case. In some embodiments of the invention, the case itself is multi-functional.

In some embodiments of the invention, the case comprises two primary components, a removable case body and a case floor. In the presently preferred embodiments, the case floor also comprises the telescope base 2013 of the telescope housed within the case. In some embodiments of the invention, the case floor is coupled with one or more wheels, feet, or inserts.

The user opens the case by resting the case floor, or the wheels, feet, or inserts attached thereto, on a horizontal surface and lifting the case body upward, separating it from the case floor and exposing the portable telescope within. Optionally, a handle attached to the upper surface or side surface of the case body allows for easy transport and opening of the case. Preferably, the attachment between the handle and the case body is hinged or retractable, allowing the handle to be stowed flush with (or recessed within) the upper surface of the case cover during storage. Additional handles optionally attached to the sides of the case body can further ease transport, orientation, and opening of the case. Preferably, the case is constructed from traditional materials such as wood, leather, brass, and early plastics (i.e. Bakelite).

As explained above, in some embodiments of the invention, small, non-marring feet on the underside of the case floor allow the user to place the case on most any surface, either during storage or use, without risk of damage to the surface. Similarly, in some embodiments, wheels mounted on the underside of the case floor contact the ground when the case is tipped to the side, allowing the user to roll the case during transport. In some embodiments of the invention, threaded knobs atop the case body engage threaded tie rods extending vertically through the interior of the case to engage threaded inserts within the case floor. According to these embodiments, to separate the case body from the case floor during opening, the user must first unscrew the knobs atop the case cover. Then the user can lift and invert the case cover, setting it aside by resting it on the knobs or additional non-marring feet on the upper surface of the case body.

Preferably, when in the packed position, the handle attached to the upper surface of the case body does not extend beyond the knobs or additional feet. Also, the telescope assembly may rest on a single foot and two wheels, instead of three feet. According to these embodiments, a user does not need to tilt the case for the wheels to contact the ground.

In some embodiments of the invention, the case body and the portable telescope are secured together when stowed. In some embodiments, the case floor (aka telescope base) contains holes through which one or more tie rods pass when the portable telescope is stowed and the case is in a closed configuration. In some embodiments, one or more tie rods pass through holes in the counterweights when the portable telescope is in a stowed configuration. Thus, the tie rods not only secure the case body to the case floor but also secure the portable telescope against shifting during transport. Alternatively, in some embodiments, the counterweights are configured to telescopically collapse, thereby eliminating the need for tie rods.

In some embodiments of the invention, the case body also provides a slot or contour within which the user can stow a seat cover within the case. When removed from stowage, the seat cover engages the case body allowing the user to sit atop the case body. In some embodiments, the seat covers the open end of the inverted case cover. In some other embodiments, the seat cover engages a fold-down platform. Additionally, the side of the case body may have one or more notches that can serve as footrests or steps.

In some embodiments of the invention, the telescope base or central support contains a foam-lined drawer or locker in which the user can store eyepieces and other accessories frequently needed while using the portable telescope. In some embodiments, the drawer or locker is configured with holes that match holes in the base, allowing one or more tie rods to pass through the drawer or case when stowed within the base. In some other embodiments, the case includes padding to secure the drawers to keep them from accidentally sliding open. Preferably, the drawer or locker can be removed from the base or central support, easing access during operation of the portable telescope. The drawer or locker preferably contains a wide selection of eyepieces, each with integral adapters and spacers, which can be placed directly into the focuser at the top of the eyepiece tube. Among the eyepieces are preferably a binocular viewer and eyepieces that provide magnifications ranging from about 40× to 400×. This range of magnifications provides a wide view approximately twice as wide as the full moon and a narrow view approaching the limits of observation associated with normal atmospheric conditions.

Offset Optical Pathway

Figure 3A:
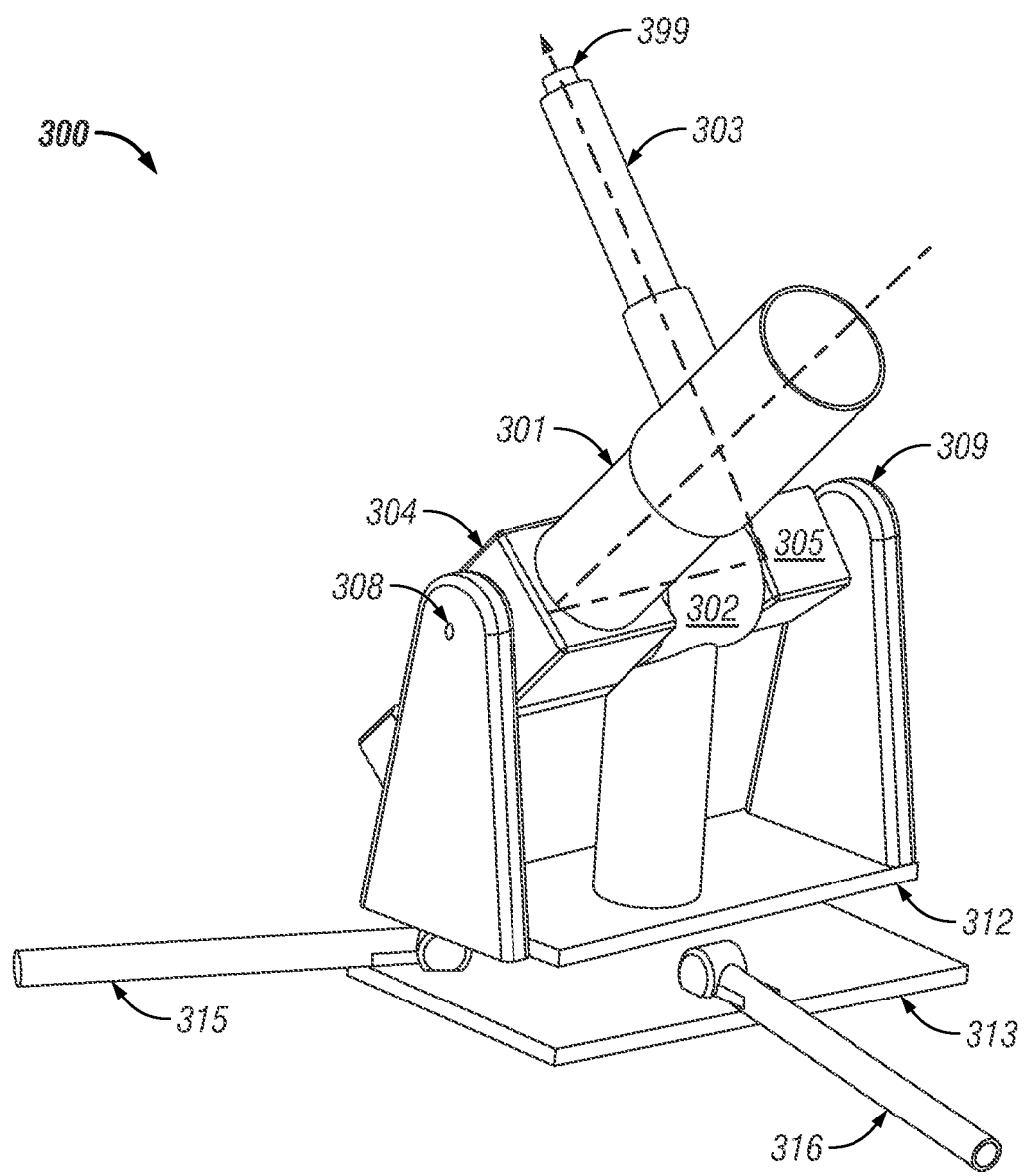
FIG. 3A illustrates a portable telescope with an offset optical pathway according to some embodiments of the invention.
Figure 3B:
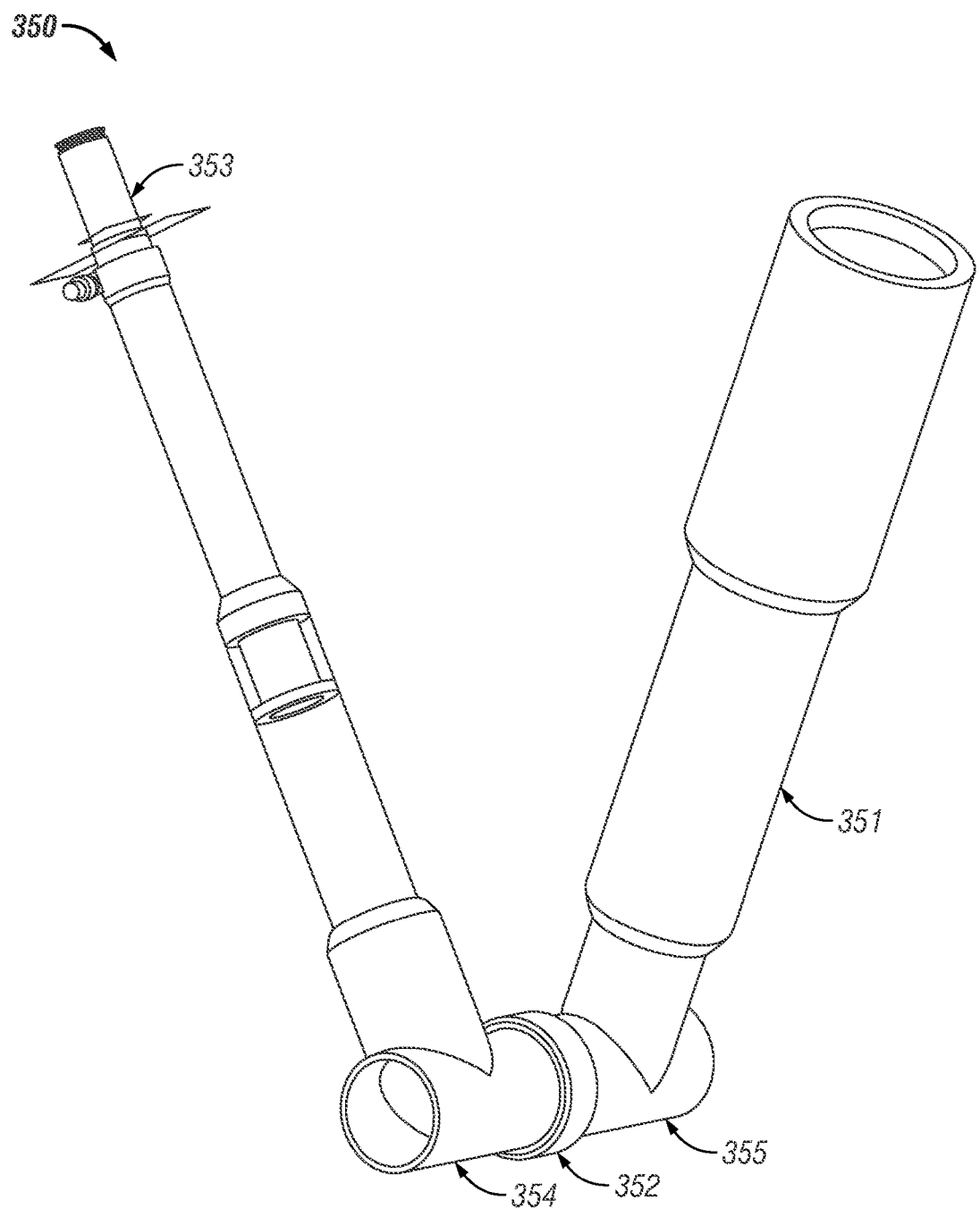
FIG. 3B illustrates a generalized representation of an alternative offset optical pathway according to some embodiments of the invention.

As explained above, the invention takes advantage of an offset optical pathway that allows adjustment of the eyepiece height independent of the objective tube elevation. FIGS. 3A and 3B illustrate optical pathway configurations according to some embodiments of the invention.

FIG. 3A illustrates a portable telescope 300 with an offset optical pathway according to some embodiments of the invention. The portable telescope 300 comprises objective tube 301, elevation pivot 308, mirror box 304, connector tube 302, mirror box 305, eyepiece tube 303, eyepiece 399, an eyepiece pivot 309, structural support base 312, telescope base 313, and tripod legs 315, 316, 317 (tripod leg 317 is not shown in this perspective). The objective tube 301 comprises an open, distal end and a proximate end coupled with the mirror box 304; likewise, the eyepiece tube 303 comprises an open, distal end and a proximate end coupled with the mirror box 305.

According to FIG. 3A, light entering the distal end of the objective tube 301 passes along the length of the objective tube 301 and enters the mirror box 304 at the proximal end of the objective tube 301. A mirror (not shown) within the mirror box reflects the light onto the axis of the connector tube 302. The light passes along the length of the connector tube 302, incident upon a mirror (not shown) within the mirror box 305 at the proximal end of the eyepiece tube 303. The mirror (not shown) within the mirror box 305 reflects the light onto the axis of the eyepiece tube 303. The light passes along the length of the eyepiece tube 303 for observation by the user through the eyepiece 399 at the distal end of the eyepiece tube 303.

According to this configuration, the mirror boxes 304, 305 thus serve to create an offset within the optical pathway and allow the eyepiece tube 303 to rotate in a plane that is external to the plane within which the objective tube 301 rotates. Accordingly, the objective tube 301 and eyepiece tube 303 can thus pivot independently of one another. Preferably, the mirrors within the mirror boxes 304, 305 are inclined to the axes of the objective tube 301 and eyepiece tube 303 at an angle of approximately 45°. This allows the objective tube and eyepiece tube to pivot about a common axis, i.e. the axis passing through the side supports and the elevation and eyepiece pivots.

As explained above, the ability to independently adjust the objective tube 301 and eyepiece tube 303 greatly improves the usability of the portable telescope. Specifically, the height of the eyepiece 399 can be adjusted through a broad range, from that used by a tall person to that used by a small child. Users of varied height can thus use the portable telescope in rapid succession without reliance upon ladders, without resorting to stooping, and without adjusting the height of the telescope base 313 via adjustment of the tripod legs 315, 316, 317. Adjustments in eyepiece height from one user to another do not affect the elevation of the objective tube. Correspondingly, changes to the elevation, or the azimuth, of the objective tube do not affect the height of the eyepiece.

FIG. 3B illustrates a generalized representation of an alternative offset optical pathway according to some embodiments of the invention.

According to these embodiments of the portable telescope 350, the mirror boxes of FIG. 3A are replaced by L-shaped tubing segments 354, 355 into which the objective tube 351 and eyepiece tube 353 are inserted. The connector tube of FIG. 3A is replaced by one or more bearings 352 between the two L-shaped tubing segments 354, 355 that allows for independent adjustment of the objective tube 351 and eyepiece tube 353. Some embodiments of the invention involve a single bearing 352, while in some other embodiments the bearing 352 comprises multiple, nested, or compound bearings.

Finder Scope with Overlay Feature

In the presently preferred embodiments of the invention, the portable telescope is also equipped with a finder scope, a sensor for capturing finder scope data, and a display for supplementing images in the finder scope eyepiece with annotations relating to what is being sensed.

Figure 4A:
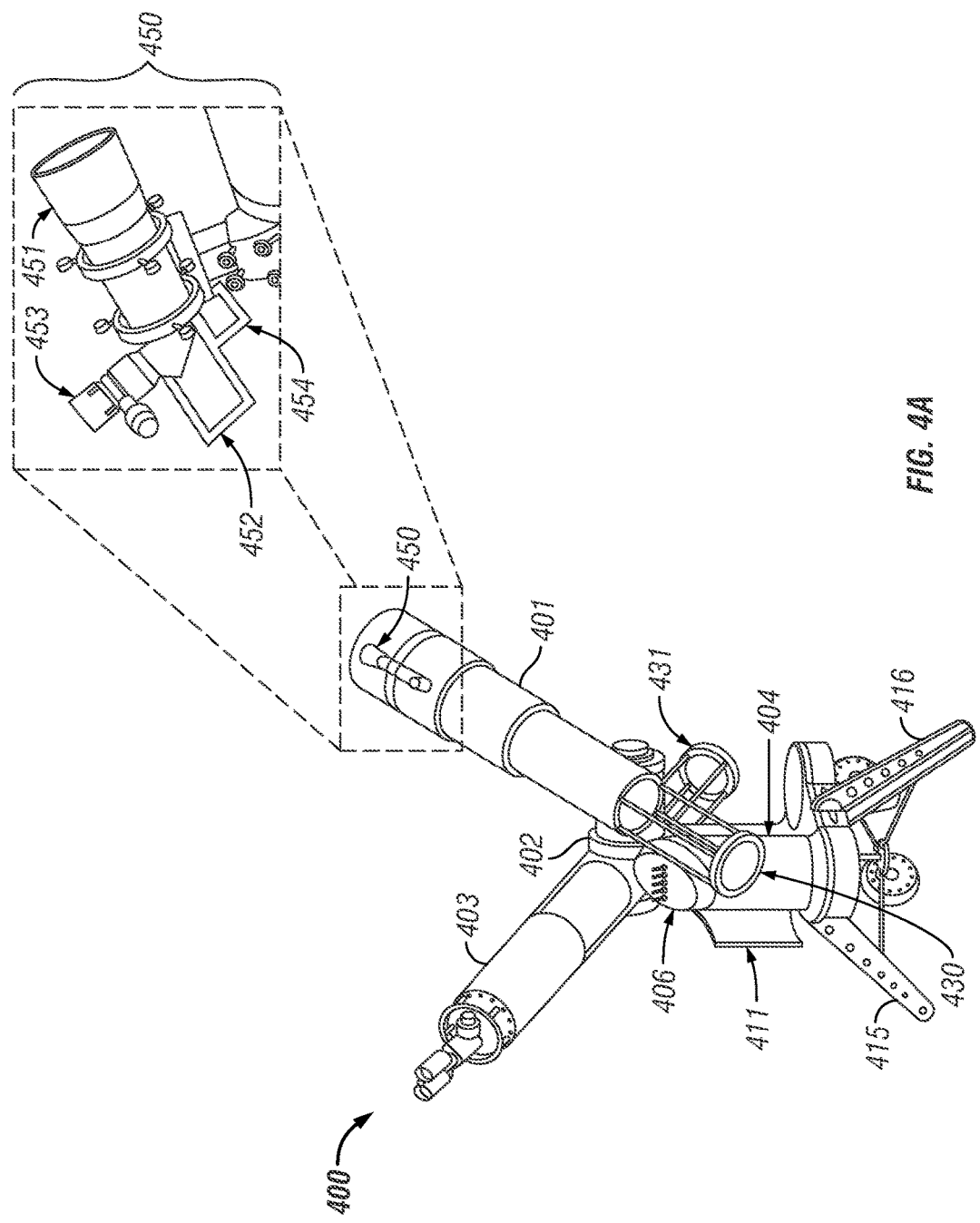
FIG. 4A illustrates a portable telescope with a finder scope according to some embodiments of the invention.

FIG. 4A illustrates a portable telescope 400 with a finder scope 450 according to some embodiments of the invention. The portable telescope 400 of FIG. 4A comprises objective tube 401 and an eyepiece tube 403 connected via a bearing 402 and supported by structural cylinder 404 or other supports and tripod legs 415, 416, 417 (tripod leg 417 is not shown in this perspective).

As explained above, some embodiments of the invention involve counterweights that slide away from or out from the objective tube 401 and eyepiece tube 403. As shown in FIG. 4A, two counterweights 430, 431 (shown as transparent) telescopically slide over the surface of the objective tube 401 and the eyepiece tube 403.

The portable telescope 400 also includes a finder scope 450 mounted on the objective tube 401. Preferably, the optical axis of the finder scope 450 is aligned with, but offset from, the axis of the objective tube 401. The finder scope 450 provides less magnification than the optical train contained within the objective tube 401, bearing 402 and eyepiece tube 403. Accordingly, the user can see a larger portion of the sky through the finder scope 450 than through the objective tube 401; therefore, the finder scope 450 is used to more roughly locate a desired astronomical object.

In the presently preferred embodiments, the finder scope 450 comprises a finder-objective lens tube 451, a finder-eyepiece tube 453, a sensor housing 452, and an illuminated display housing 454. Together, the finder-objective lens tube 451, a finder-eyepiece tube 453, a sensor (not shown) within the sensor housing 452, and an illuminated display (not shown) within the illuminated display housing 454 are configured for presenting computer-generated graphical overlays within the finder scope 450 according to the invention.

Figure 4B:
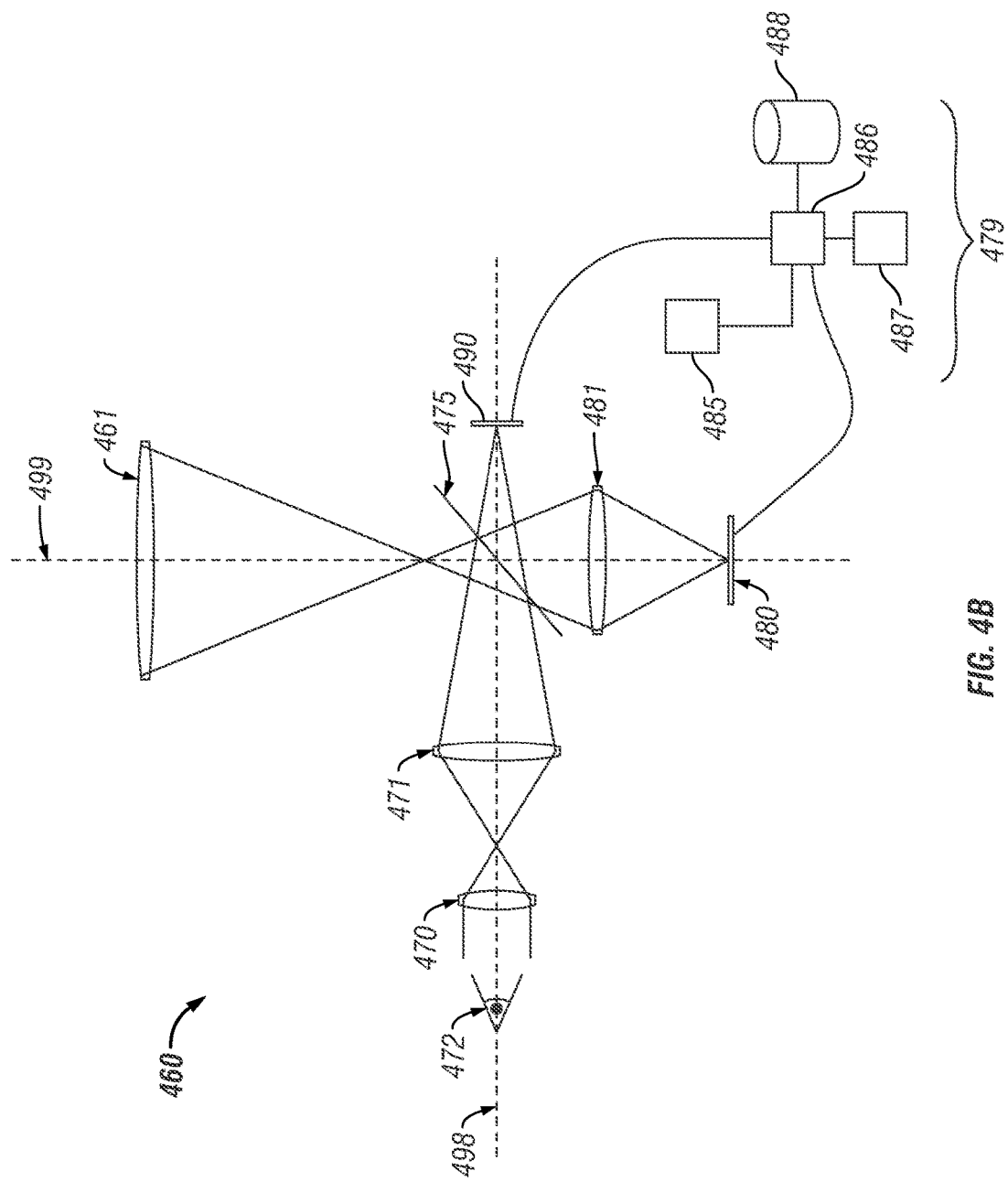
FIG. 4B illustrates an optical train and computer configured for presenting overlays within a finder scope according to some embodiments of the invention.

FIG. 4B illustrates an optical train 460 and computer system 479 configured for presenting overlays within a finder scope according to some embodiments of the invention. The optical train 460 in FIG. 4B is illustrative. Indeed, a person having ordinary skill in the art, and having the benefit of this disclosure, will readily understand that one or more additional focusing lenses, relay lenses, etc. may be included in the optical train 460 to achieve the inventive concepts disclosed broadly herein.

Light enters the finder scope through an objective lens 461 aligned along a primary optical axis 499. The eyepiece 470 is positioned on a second optical axis 498 that is perpendicular to the primary optical axis 499 and a beamsplitter 475 is positioned substantially at the intersection of the primary optical axis 499 and the second optical axis 498.

According to this setup, a portion of the light incident on the beamsplitter 475 from the objective lens 461 is reflected from the front surface of a beamsplitter 475 onto the second optical axis 498. The reflected light passes through a relay lens 471 and the eyepiece 470 for observation by the user 472. Accordingly, the finder scope 450 housing the optical train 460 is a right-angle finder scope, providing an inverted image to the user 498.

The portion of the light not reflected onto the second optical axis 498 passes through the beamsplitter 475, continuing along the primary optical axis 499 where it is focused onto an image sensor 480 by a relay lens 481. Thus, both the user 498 and the image sensor 480 receive light defining images representing the same portion of the sky within the field of view of the finder scope 450.

The image sensor 480 is coupled with a computer processor 486 and memory device 487. The image sensor 480 converts an optical image into electronic signal. In the presently preferred embodiments of the invention, the image sensor 480 comprises a charge-coupled device (CCD) or a complementary metal-oxide-semiconductor (CMOS) active pixel sensor.

In the presently preferred embodiments of the invention, the processor 486 is coupled with one or more astrological databases 488 that include position data and other information about stars, galaxies, planets, black holes, nebulae, comets, etc. In some embodiments of the invention, the processor 486 physically coupled with the database 488. In some other embodiments of the invention, the processor 486 is coupled with the database 488 via one or more computer networks.

According to these embodiments, the processor 486 determines what portion of the sky is being viewed by the finder scope 450 by analyzing the converted image from the image sensor 480 and comparing the image with information from the database 488. Using the determination of what portion of sky is being viewed, the processor 486 accesses information from the database 488 for displaying to a user. This information is displayed via the illuminated display 490 that lies on the second optical axis 498, on the opposite side of the beamsplitter 475 from the relay lens 471 at the focal distance of the relay lens 471. Accordingly, light from the illuminated display 490 passes through the beamsplitter 475 along the second optical axis 498, continuing through the relay lens 471 and eyepiece 470 for viewing by the user 472. Thus, imagery presented on the illuminated display 490 appears as a coincident overlay atop (or alongside) the portion of the sky within the field of view of the objective lens 461 of the finder scope 450.

In some embodiments of the invention, the beamsplitter 475 is a 50%-transmission-50%-reflection beamsplitter (i.e. a half-silvered mirror), and half of the light incident upon the front surface of the beamsplitter 475 is reflected onto the second optical axis 498. Other transmission-reflection combinations may be selected based on the sensitivity of the sensor 480 and the relative brightness of the night sky and the illuminated display 490.

In the presently preferred embodiments of the invention, the output of the sensor 480 is passed to the processor configured to execute star tracking software that, based on the location, and possibly brightness, of stars within the field of view of the finder scope, determines a pointing vector (i.e. azimuth and elevation) for the primary optical axis of the finder scope. The star tracking software may also consider measurements from encoders and accelerometers on the elevation and azimuth pivots (if present) in determining the pointing vector.

Some embodiments of the invention involve a user interface for inputting location information or an integrated GPS device. According to these embodiments, the location of the portable telescope 400 is determined by a user input or a GPS measurement. Alternatively, the location of the portable telescope 400 is calculated by the finder scope 450 itself using the image of the sky, accelerometer data, encoder data, current time, and the astronomical database 488.

Based on the pointing vector and the location of the portable telescope 400, the portable telescope 400 can identify objects of interest within the field of view of the finder scope using a star map.

Once the location of the portable telescope 400 is determined, the image overlays associated with the field of view of the finder scope can include directional cues (i.e. arrows), highlighting, or labels that assist the user in locating or identifying astronomical objects of interest.

In some embodiments of the invention, the portable telescope 400 offers multiple overlays simultaneously (i.e. as "layers") that can be toggled on and off as desired by the user. In one variation of the invention, the multiple overlays are organized based on classes of astronomical objects (i.e. planets, comets, binary stars, bright stars, deep sky, constellations, and galaxies).

Figure 4C:
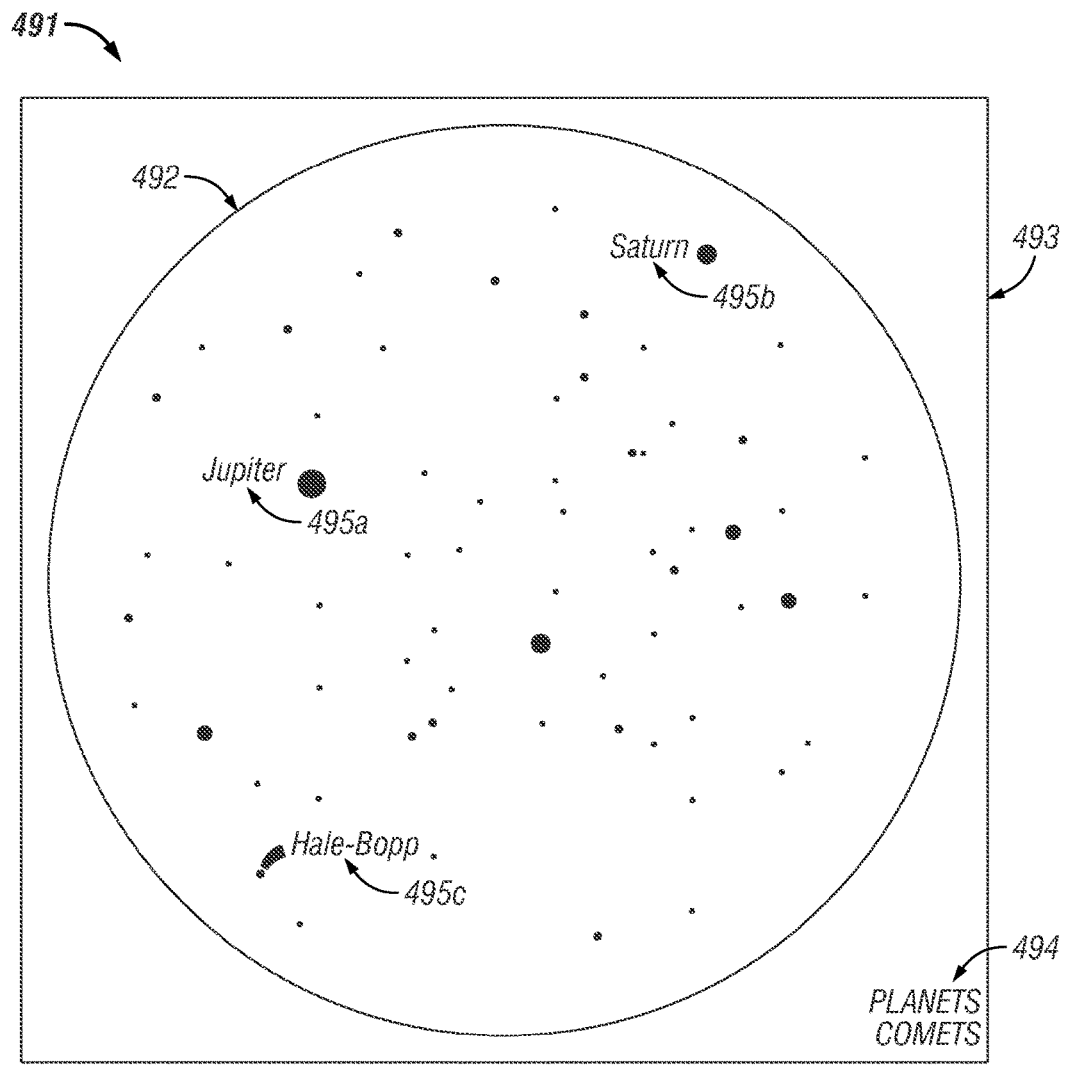
FIG. 4C illustrates an exemplary overlay within the finder scope according to some embodiments of the invention.

FIG. 4C illustrates an exemplary overlay 491 within the finder scope 450 according to some embodiments of the invention. The field of view 492 of the objective lens lies within the extent 493 of the illuminated display as observed through the eyepiece of the finder scope 450. The illuminated display can thus present an overlay 491 with information interior or exterior to the field of view of the objective lens. For example, in FIG. 4C, the overlay includes an indication 494 of which layers (i.e. Planets and Comets) are currently active. The layers indicator 494 is presented outside the field of view of the objective lens so as to minimize obstruction of astronomical objects. Within the field of view, the overlay includes labels 495a, 495b, 495c (i.e. Jupiter, Saturn, and Hale-Bopp) of astronomical objects within the classes of objects corresponding to the active layers.

In some embodiments of the invention, a control panel or other interface is provided to the user as an interface for specifying various display attributes. Referring again to FIG. 4A, in some embodiments of the invention, an interface 406 is provided for a user to control what overlays are displayed by the illuminated display 490. According to FIG. 4A, the interface 406 is coupled with the structural cylinder 404, located near the telescope base. Also shown in FIG. 4A, the structural cylinder 404 includes a compartment 430 that is accessible by a door 411 and used for storage of the power supply 485, the processor 486, eyepieces, and/or other computing or optical equipment. In the presently preferred embodiments of the invention, the power supply 485 comprises a rechargeable battery power supply with a recharging cable.

In the presently preferred embodiments, the control panel includes several simple toggle switches and a display and/or one or more lighted indicators (i.e. LEDs).

Figure 4D:
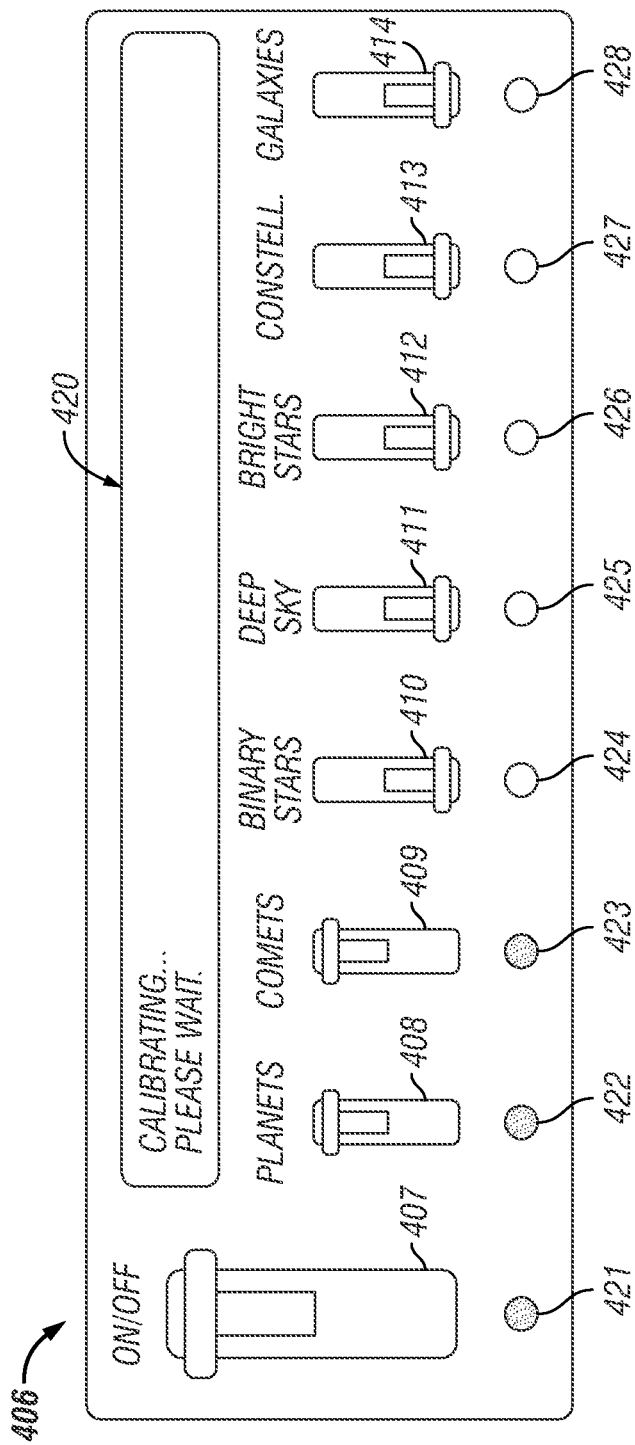
FIG. 4D illustrates a control panel for a portable telescope according to some embodiments of the invention.

FIG. 4D illustrates a control panel 406 for a portable telescope 400 according to some embodiments of the invention. As shown in FIG. 4D, the control panel 406 includes a power switch 407, several simple toggle switches 408, 409, 410, 411, 412, 413, 414, a display 420, and one or more LED indicators 421, 422, 423, 424, 425, 426, 427, 428. In some embodiments, the display 420 automatically adjusts in brightness based on the ambient light level.

Some embodiments of the invention involve operations beyond that offered by the control panel (i.e. more sophisticated star guidance programs). According to these embodiments, the portable telescope can also be connected to a computer or PDA by either a wired or wireless connection, such as a Bluetooth® connection or a Universal Serial Bus drive. Alternatively a more sophisticated display is connected to the portable telescope.

Some embodiments of the invention involve a user interface for inputting location information or integrating an external GPS device. According to these embodiments, the location of the portable telescope 400 is determined by a user input or a GPS measurement. Alternatively, as described above, the location of the portable telescope 400 is calculated by the finder scope 450 itself using the image of the sky, accelerometer data, encoder data, current time, and the astronomical database 488.

Referring again to FIG. 4B, because the imagery presented by the illuminated display is also visible to the sensor as reflected from the beamsplitter, it may potentially affect the determination of the pointing vector by the star tracker. Indeed, the star tracking software may erroneously interpret annotations or labels within the imagery presented by the illuminated display as actual astronomical objects. To mitigate this difficulty, one or more of several approaches may be used.

In one approach, the sensor captures light from points within a central region of the field of view of the finder scope, and the illuminated display presents imagery outside of this central region, i.e. within the outer margins of the field of view.

In a second approach, the illumination of the illuminated display and the capture of light by the sensor are temporally coordinated such that the illuminated display is suppressed while the sensor captures light.

In a third approach, the beamsplitter is a polarized beamsplitter, transmitting light of polarization A and reflecting light of polarization B. Assuming that the starlight is unpolarized (i.e. comprised of light of both polarization A and light B), the sensor and eye will receive approximately half of the light entering through the objective lens. The illuminated display is designed, either inherently (in the case of an LCD) or with the addition of a polarizing filter, to emit light of polarization A. Thus none of the light emitted by the illuminated display is reflected to the sensor.

In a fourth approach, the imagery displayed on the illuminated display, which is known explicitly, is subtracted on a pixel-by-pixel basis from the sensor measurements using the processor.

Referring again to FIG. 4B, in some embodiments of the invention, activating any of the switches 408, 409, 410, 411, 412, 413, 414 engages a haptic feedback system that provides an attractive "force" towards the selected class of objects as the user manually adjusts the azimuth and elevation of the objective tube, creating a virtual detent in the sky. Optionally, the control panel display and/or the illuminated display within the finder scope show the name and/or coordinates of the object that is currently attracting the objective tube.

Unpacking, Motorization, and Calibration

As explained above, the presently preferred embodiments of the invention involve motorizing various components and automatically calibrating and positioning the portable telescope in order to avoid the complicated setup process of the prior art.

As explained above, the presently preferred embodiments of the invention involve the case containing the telescope as well as any other accessory needed to operate the telescope. According to these embodiments, a user wheels the case to a desired location, folds down and locks the tripod legs, removes the case body and initiates the set up process (see FIG. 2D above).

Figure 5A:
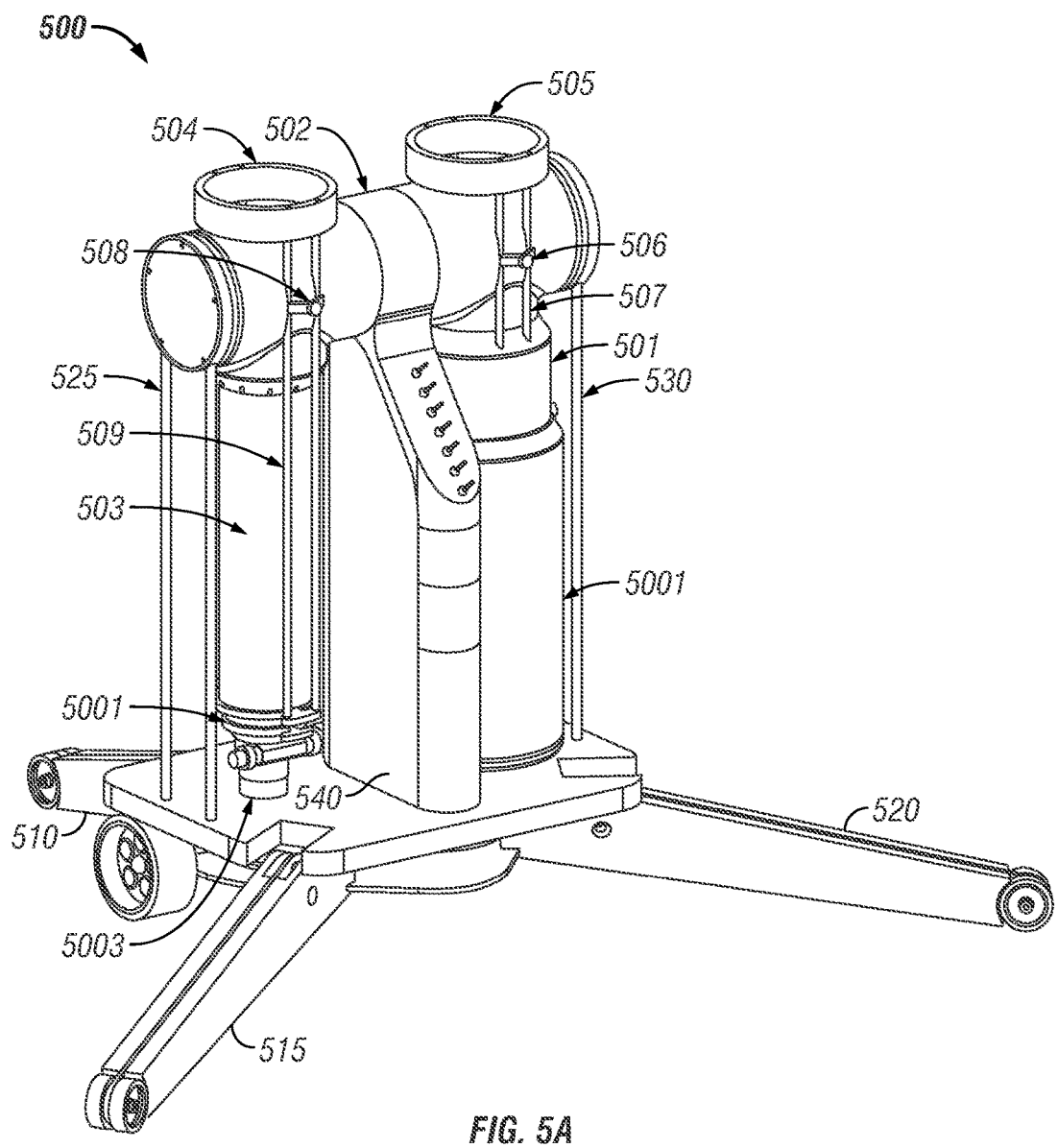
FIG. 5A illustrates a portable telescope in an intermediate stage of unpacking according to some embodiments of the invention.

FIG. 5A illustrates a portable telescope 500 after the tripod legs 510, 515, 520 are folded away from the case cover (not shown) and the case cover is removed. The portable telescope 500 comprises an objective tube 501, a dew shield 5001 (shown in a collapsed configuration in FIG. 5A), a telescoping tube 503, a focuser 5001 and an eyepiece tube 5003 supported by a central support 540 and two side supports 525, 530 and connected via a bearing housing 502, thereby defining an offset optical pathway, as explained above. Likewise, in some embodiments of the invention, a dew shield (not shown) is slidably coupled with the end of the optical tube 501.

A counterweight 505 is slidably and telescopically coupled with the objective tube 501 via slide rails 507 and secured in place with a bracket and thumbscrew assembly 506. Likewise, a counterweight 504 is slidably and telescopically coupled with the eyepiece tube 503 via slide rails 509 and secured in place with a bracket and thumbscrew assembly 508.

After removing the case body to expose the portable telescope 500 therein, a user extends and locks the counterweights 504, 505; rotates the objective tube 501; rotates the telescoping tube 503; extends the eyepiece 5003; and extends the dew shield 5001.

Figure 5B:
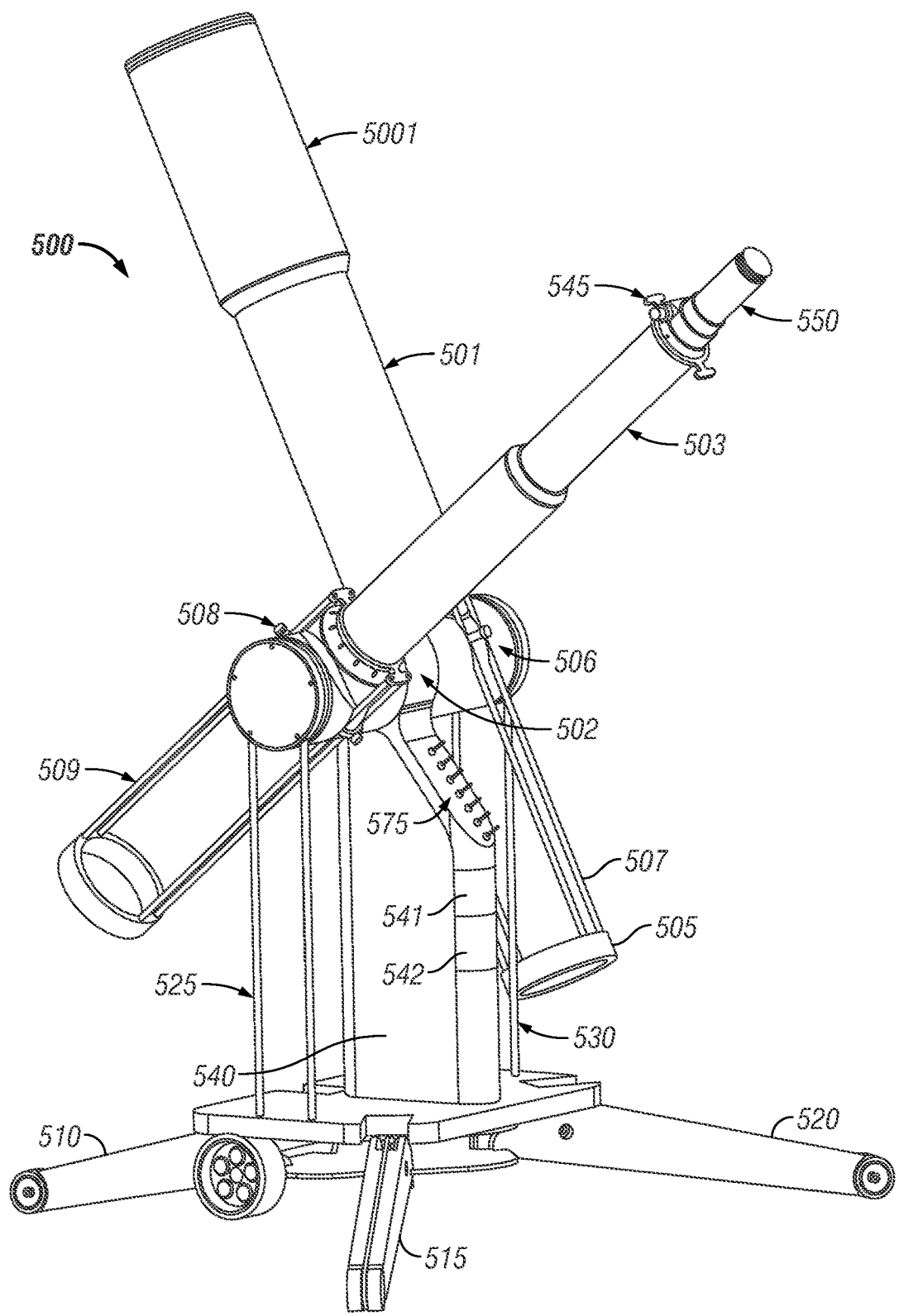
FIG. 5B illustrates an unpacked portable telescope according to some embodiments of the invention.

FIG. 5B illustrates an unpacked portable telescope 500 according to some embodiments of the invention. As shown in FIG. 5B, the eyepiece tube comprises an adjustment handle 545 and an eyepiece 550 is extended from the telescoping tube 503. One or more focusers or other lenses are also optionally included.

As explained above, the presently preferred embodiments of the invention involve a motorized portable telescope. In some embodiments of the invention, the motion of the objective tube 501 about the elevation pivot and the azimuth pivot can be driven by motors, with the current angular positions monitored by digital encoders, accelerometers, and/or a finder scope and star tracker.

According to these embodiments, the portable telescope 500 includes a power supply (not shown), a finder scope (not shown), a computer processor (not shown), a clock (not shown), and an astronomical database (not shown), as explained in FIG. 4B. In the presently preferred embodiments of the invention, the power supply comprises a rechargeable battery power supply with a recharging cable.

In the presently preferred embodiments of the invention, the structural member 540 contains the power supply, computer processor, and clock. Also in the presently preferred embodiments of the invention, the structural member 540 contains one or more drawers 541, 542 for storing eyepieces, lens, and other accoutrements.

Referring to FIG. 5B, the portable telescope 500 includes a control panel 575 for interfacing with the computer processor and astronomical database and for selecting objects that the user is interested in. In some embodiments of the invention, the control panel 575 is substantially similar to that shown in FIGS. 4A and 4D.

According to these embodiments, a user simply sets up the tripod legs 510, 515, 520, removes the case, unpacks the portable telescope 500, and initiates automatic calibration of the portable telescope 500.

Referring again to FIG. 4D, the primary toggle switch 407 on the control panel is labeled ON/OFF. Upon activating the switch 407, a lighted indicator labeled CALIBRATING illuminates and the portable telescope performs the automatic calibration. Optionally, the display may present a message indicating that the portable telescope is performing a calibration procedure.

Automatic calibration comprises the finder scope locating reference points in the sky, looking up the reference points in the database, determining the time and date using the clock, determining the orientation of the telescope base and objective, and determining the location of the telescope based on the reference point, accelerometers and/or encoders, and the time and date.

After calibration is complete, a lighted indicator labeled READY illuminates. Alternatively, or in addition, the display may present a message indicating that the calibration procedure is complete. After calibration is complete, the user can freely adjusting the azimuth and elevation of the objective tube.

In some embodiments of the invention, a laser pointer with an on/off switch integrated with the finder scope assists in pointing the objective tube at particular location in the sky. The control panel display, as well as the illuminated display within the finder scope, dynamically identifies objects of interest, both within the field of view and in the vicinity of the field of view.

As explained above, the control panel further includes toggle switches 408, 409, 410, 411, 412, 413, 414 labeled with classes of astronomical objects (i.e. planets, comets, binary stars, bright stars, deep sky, constellations, and galaxies).

Finally, if (as described above) the portable telescope is equipped with motors controlling the azimuth and elevation of the objective tube, the control panel also includes an additional toggle switch (not shown) labeled TRACKING. When activated, the motors adjust the azimuth and elevation of the portable telescope to compensate for the motion of the earth.

As will be understood by those familiar with the art, the invention may be embodied in other specific forms without departing from the spirit or essential characteristics thereof. Likewise, the particular naming and division of the features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A telescope comprising:
    an objective tube including an objective lens and an objective tube mirror,
    an eyepiece tube including an eyepiece viewer and an eyepiece tube mirror, and
    a connector defining an optical pathway between the objective tube and the eyepiece tube;
    wherein the objective tube and the eyepiece tube are each rotationally coupled with the connector;
    wherein the objective tube and the eyepiece tube are rotatable independently of one another in a rotational plane that is substantially orthogonal to the optical pathway, and
    wherein a visual representation of a particular object received through the objective lens remains in the eyepiece viewer via an optical train that includes the objective tube, the objective tube mirror, the optical pathway, the eyepiece tube mirror, and the eyepiece tube, despite a rotational change in the eyepiece tube relative to the objective tube.

2. The telescope of claim 1, wherein the optical pathway is substantially closed.

3. The telescope of claim 1, wherein the eyepiece tube includes a focusing lens for focusing received light.

4. The telescope of claim 1, further comprising:
    a first counterweight coupled with the objective tube; and
    a second counterweight coupled with the eyepiece tube.

5. The telescope of claim 4, wherein the first counterweight extends away from the objective tube in a direction parallel with the objective tube, wherein the second counterweight extends away from the eyepiece tube in a direction parallel with the eyepiece tube, and wherein the first counterweight and the second counterweight are configured to be releasably fixed at a given position.

6. The telescope of claim 4, wherein the counterweight is slidably and telescopically coupled with the objective tube and configured to extend away from the objective tube in a direction parallel with the objective tube and lock at an extended position, and wherein the second counterweight is slidably and telescopically coupled with the eyepiece tube and configured to extend away from the eyepiece tube in a direction parallel with the eyepiece tube and lock at an extended position.

7. The telescope of claim 1, wherein the objective tube includes an objective mirror box containing the objective tube mirror, and wherein the eyepiece tube includes an eyepiece mirror box containing the eyepiece tube mirror.

8. The telescope of claim 1, further comprising:
    a finder scope coupled with the objective tube, wherein the finder scope includes:
        a finder scope lens optically aligned along a first axis, for receiving incident light originating from the an optical axis substantially parallel to light received by the objective lens;
        a finder scope eyepiece optically aligned along a second axis, wherein the finder scope eyepiece is configured for observing representations of images defined by the received incident light; and
        a beamsplitter situated between the finder scope lens and the finder scope eyepiece, such that a portion of incident light is reflected from the first axis to the second axis and a portion of incident light passes through the beamsplitter on the first axis.

9. The telescope of claim 8, further comprising:
    an image sensor substantially centered on the first axis on a side of the beam splitter opposite to the finder scope lens, wherein the image sensor is configured for converting incident light into an electrical signal.

10. The telescope of claim 9, further comprising:
    a power supply;
    a computer memory; and
    a microprocessor configured for
        receiving the electrical signal,
        comparing the electrical signal against digital representations of astronomical objects stored in any of the computer memory or from a computer network, and
        recognizing an astronomical object viewed in the finder scope, based on the comparing.

11. The telescope of claim 10, further comprising:
    an illuminated display situated on the second axis on a side of the beam splitter opposite to the eyepiece.

12. The telescope of claim 11, wherein the illuminated display is coupled with the microprocessor, wherein the microprocessor is further configured for displaying the digital representation of the astronomical object on the illuminated display, thereby forming an overlay that is viewable along with the representation of the image defined by the received incident light.

13. The telescope of claim 12, further comprising a control panel interface coupled with the microprocessor, wherein a user can select a particular feature for display via the overlay.

14. The telescope of claim 13, further comprising:
    a motor for any of:
        rotating the telescope about an azimuth pivot; and
        rotating the objective tube.

15. The telescope of claim 13, further comprising:
    a time measurement device, and wherein the control panel interface includes a control for initiating automatic calibration of the telescope for
        locating a reference point in the sky using the finder scope,
        looking up the reference point in the memory,
        determining the time and date using the time measurement device, and
        determining the location of the telescope based on the reference point and the time and date.

16. The telescope of claim 9, further comprising:
an actuator coupled with the microprocessor, wherein the actuator is configured for providing haptic feedback to a user when an object is recognized by the microprocessor.

17. The telescope of claim 9, further comprising:
an actuator coupled with the microprocessor, wherein the actuator is actuators is configured for tracking movement of an object that is recognized by the microprocessor.

18. The telescope of claim 1, further comprising:
a telescope base substantially defining a plane;
a plurality of legs, each leg coupled to the telescope base;
an azimuth pivot coupled to the telescope base; and
a central support rotationally coupled to the telescope base via the azimuth pivot, the central support extending away from the telescope base in a direction substantially orthogonal to the plane defined by the telescope base.

19. The telescope of claim 18, further comprising:
two or more wheels coupled with the telescope base.

20. The telescope of claim 18, wherein each leg of the plurality of legs is coupled to the telescope base via a hinged coupling such that the plurality of legs are configured to fold both:
in a downward direction, thereby elevating the telescope and the wheels above the supporting surface; and
in an upward direction.

21. The telescope of claim 18, further comprising:
a case with an opening configured for accepting the insertion of the telescope;
such that the azimuth pivot, the central support, and an optical assembly are housed within the case, and such that the plurality of legs are free to fold in a downward direction and in an upward direction when the telescope is inserted within the case, and wherein the telescope base closes the opening when the telescope is inserted into the case.

22. The telescope of claim 18, further comprising:
a center support member extending from substantially the center of the telescope base and coupling with the connector,
a first side support extending substantially from a first edge of the telescope base and coupling with the objective tube; and
a second side support extending substantially from a second edge of the telescope base and coupling with the eyepiece tube.

23. The telescope of claim 22, wherein the connector is integrally formed in the center support member, and wherein the center support member is substantially hollow.

24. The telescope of claim 23, further comprising:
a first vent located in the substantially hollow center central support member;
an air filter positioned within the substantially hollow center support member between the first vent and a second vent; and
a desiccator positioned within the substantially hollow center support member between the first vent and the second vent.

25. The telescope of claim 1, wherein the eyepiece tube can be rotated without interfering with a position of the objective lens.

26. The telescope of claim 25, wherein multiple users having different heights can view the particular object without readjusting the objective tube.

27. A method, comprising:
rotationally coupling each of an objective tube and an eyepiece tube to a connector,
wherein the objective tube includes an objective lens and an objective tube mirror,
wherein the eyepiece tube includes an eyepiece viewer and an eyepiece tube mirror, and
wherein the connector defines an optical pathway between the objective tube and the eyepiece tube,
wherein the objective tube and the eyepiece tube are rotatable independently of one another in a rotational plane that is substantially orthogonal to the optical pathway; and
visually representing of a particular object received through the objective lens in the eyepiece viewer via an optical train that includes the objective tube, the objective tube mirror, the optical pathway, the eyepiece tube mirror, and the eyepiece tube, despite a rotational change in the eyepiece tube relative to the objective tube.

28. The method of claim 27, wherein the eyepiece tube can be rotated without interfering with a position of the objective lens.

29. The method of claim 28, wherein multiple users having different heights can view the particular object without readjusting the objective tube.

* * * * *